US012652159B2

(12) United States Patent
Qiu

(10) Patent No.: US 12,652,159 B2
(45) Date of Patent: Jun. 9, 2026

(54) METHOD AND APPARATUS OF PROVIDING SERVICE FOR LARGE MODEL SCENARIO, AND MEDIUM

(71) Applicant: BEIJING BAIDU NETCOM SCIENCE TECHNOLOGY CO., LTD., Beijing (CN)

(72) Inventor: Qi Qiu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 95 days.

(21) Appl. No.: 18/747,157

(22) Filed: Jun. 18, 2024

(65) Prior Publication Data

US 2025/0015973 A1 Jan. 9, 2025

(30) Foreign Application Priority Data

Dec. 20, 2023 (CN) .......................... 202311766540.6

(51) Int. Cl.
*H04L 21/00* (2006.01)
*H04L 9/08* (2006.01)
*H04L 9/32* (2006.01)

(52) U.S. Cl.
CPC .......... *H04L 9/0816* (2013.01); *H04L 9/3297* (2013.01)

(58) Field of Classification Search
CPC ............................. H04L 9/0816; H04L 9/3297
See application file for complete search history.

(56) References Cited

U.S. PATENT DOCUMENTS

| | | | | |
|---|---|---|---|---|
| 12,111,859 | B2 * | 10/2024 | Siebel | G06F 16/345 |
| 2023/0281396 | A1 * | 9/2023 | Shlomov | G06F 40/20 |
| | | | | 704/9 |
| 2024/0202225 | A1 * | 6/2024 | Siebel | G06N 20/00 |
| 2024/0363103 | A1 * | 10/2024 | Altaf | G10L 15/08 |
| 2025/0053804 | A1 * | 2/2025 | Naressi | G06N 3/045 |
| 2025/0335494 | A1 * | 10/2025 | Yao | G06F 16/438 |

OTHER PUBLICATIONS

Jin et al., "PAI-WSIT: An AI Service Platform With Support for Storing and Sharing Whole-Slide Images With Metadata and Annotations," in IEEE Access, vol. 7 (Year: 2019).*
Yu et al., "PSCVFinder: A Prompt-Tuning Based Framework for Smart Contract Vulnerability Detection," 2023 IEEE 34th International Symposium on Software Reliability Engineering (ISSRE), Florence, Italy, pp. 556-567 (Year: 2023).*

* cited by examiner

*Primary Examiner* — Morshed Mehedi
(74) *Attorney, Agent, or Firm* — Osha Bergman Watanabe & Burton LLP

(57) ABSTRACT

A method of providing a service for a large model scenario, applied to an intelligent agent platform, includes: in response to receiving service request information from a first interface of the intelligent agent platform, invoking a key information extraction service in the intelligent agent platform, and performing key information extraction on the service request information to obtain first key information; in a case where a number of first key information is greater than a preset number, invoking an information merging service in the intelligent agent platform, and determining second key information from a plurality of first key information; and invoking a service content determination service in the intelligent agent platform, and determining a first target service content based on the second key information.

18 Claims, 4 Drawing Sheets in response to receiving service request information from a first interface of the intelligent agent platform, invoking a key information extraction service in the intelligent agent platform, and performing key information extraction on the service request information to obtain first key information — S101 in a case where a number of first key information is greater than a preset number, invoking an information merging service in the intelligent agent platform, and determining second key information from a plurality of first key information — S102 invoking a service content determination service in the intelligent agent platform, and determining a first target service content based on the second key information — S103

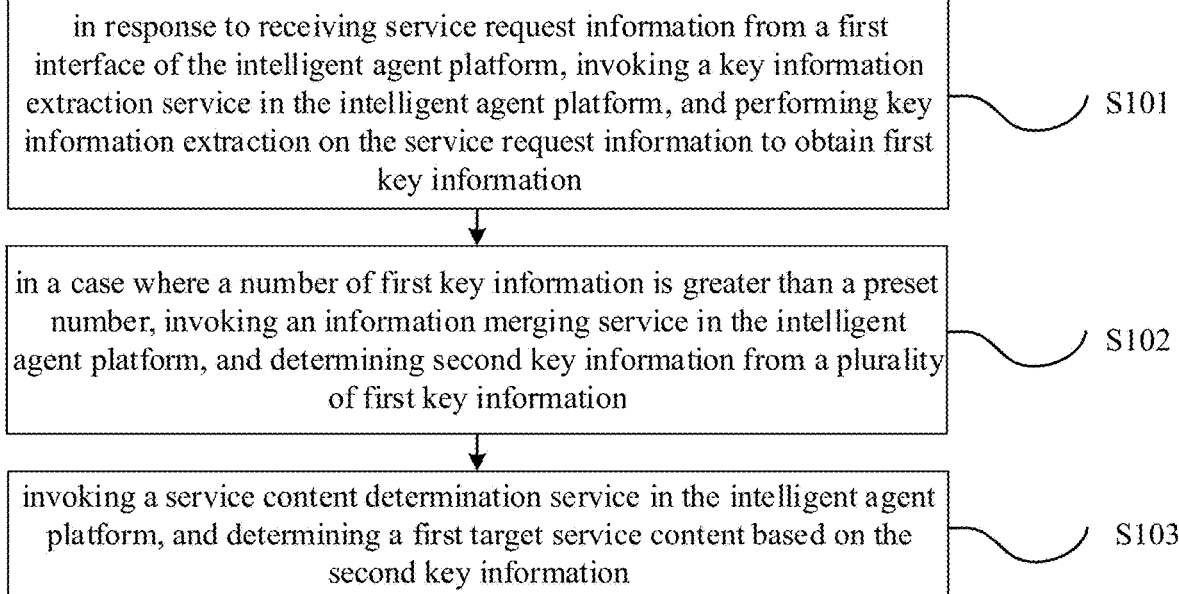

in response to receiving service request information from a first
interface of the intelligent agent platform, invoking a key information
extraction service in the intelligent agent platform, and performing key
information extraction on the service request information to obtain first
key information                                                          S101 in a case where a number of first key information is greater than a preset
number, invoking an information merging service in the intelligent
agent platform, and determining second key information from a plurality
of first key information                                                 S102 invoking a service content determination service in the intelligent agent
platform, and determining a first target service content based on the
second key information                                                   S103

FIG.1

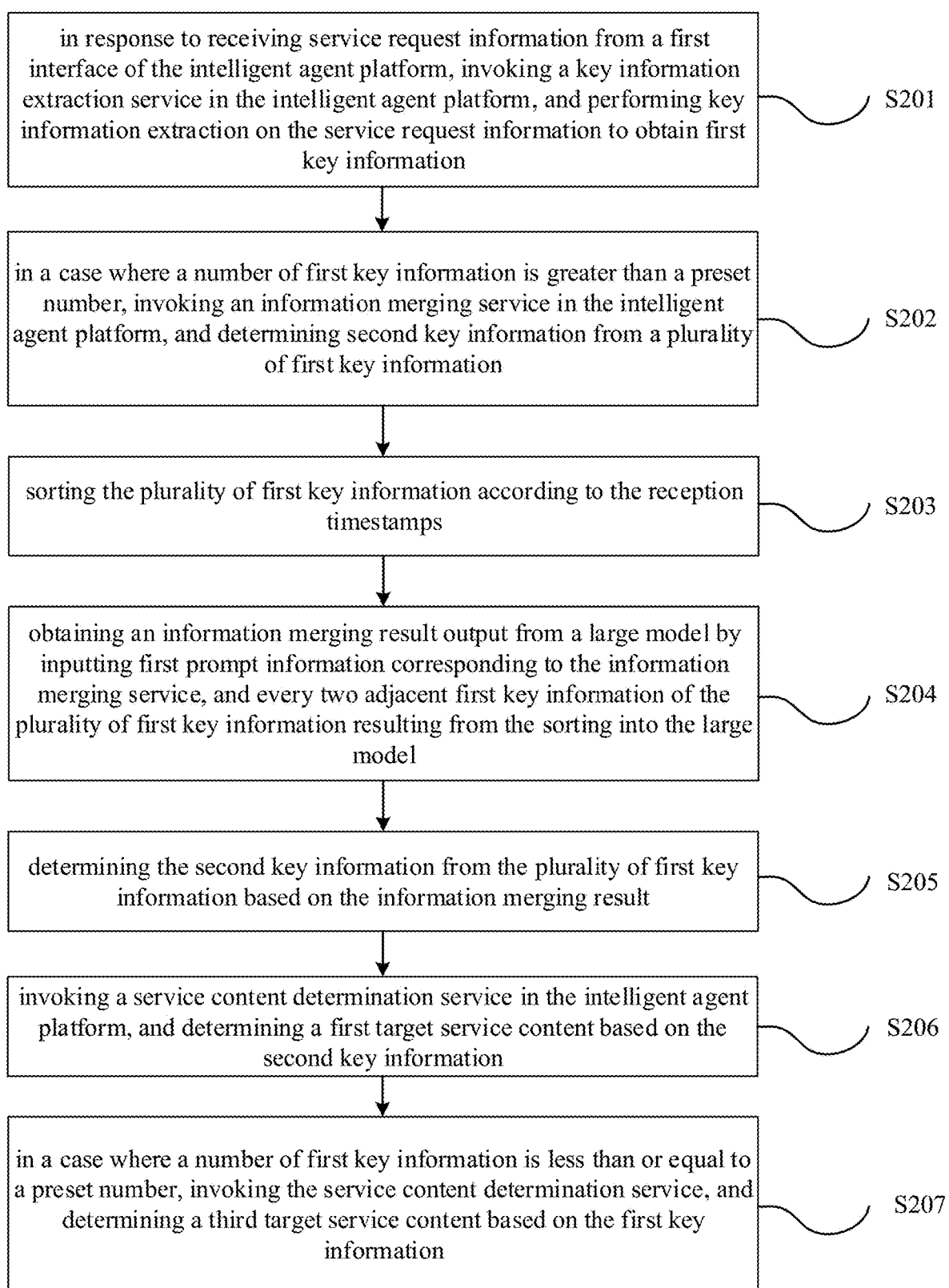

in response to receiving service request information from a first interface of the intelligent agent platform, invoking a key information extraction service in the intelligent agent platform, and performing key information extraction on the service request information to obtain first key information — S201 in a case where a number of first key information is greater than a preset number, invoking an information merging service in the intelligent agent platform, and determining second key information from a plurality of first key information — S202 sorting the plurality of first key information according to the reception timestamps — S203 obtaining an information merging result output from a large model by inputting first prompt information corresponding to the information merging service, and every two adjacent first key information of the plurality of first key information resulting from the sorting into the large model — S204 determining the second key information from the plurality of first key information based on the information merging result — S205 invoking a service content determination service in the intelligent agent platform, and determining a first target service content based on the second key information — S206 in a case where a number of first key information is less than or equal to a preset number, invoking the service content determination service, and determining a third target service content based on the first key information — S207

FIG.2

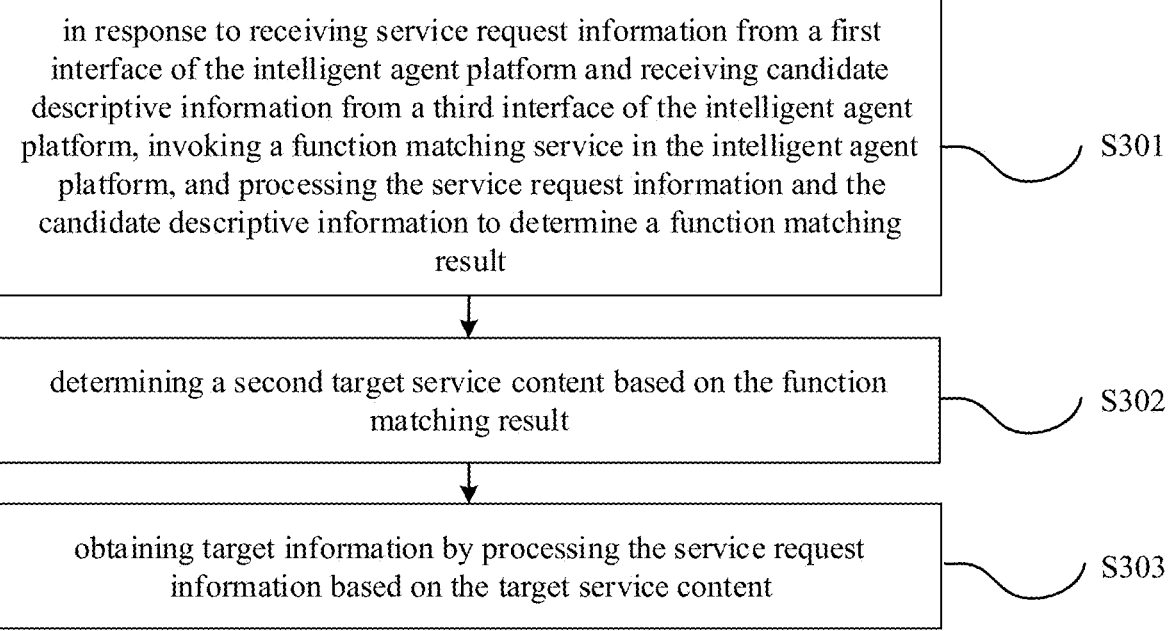

in response to receiving service request information from a first interface of the intelligent agent platform and receiving candidate descriptive information from a third interface of the intelligent agent platform, invoking a function matching service in the intelligent agent platform, and processing the service request information and the candidate descriptive information to determine a function matching result    S301 determining a second target service content based on the function matching result    S302 obtaining target information by processing the service request information based on the target service content    S303

FIG.3

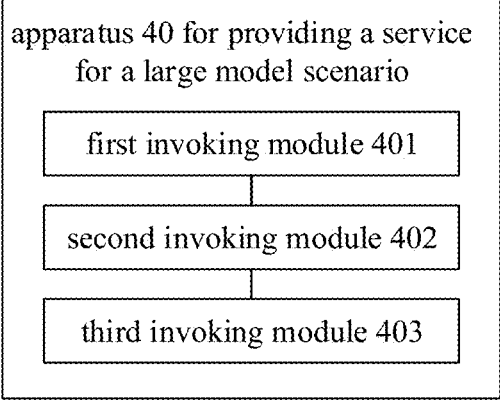

apparatus 40 for providing a service for a large model scenario first invoking module 401 second invoking module 402 third invoking module 403

FIG.4

METHOD AND APPARATUS OF PROVIDING SERVICE FOR LARGE MODEL SCENARIO, AND MEDIUM

TECHNICAL FIELD

The present disclosure relates to the field of computer technology, in particular to the field of artificial intelligence technology such as deep learning, natural language processing, and large model, and in particular to a method of providing a service for a large model scenario, an electronic device, and a medium.

BACKGROUND

An intelligent agent platform is a computer program or a system with abilities of perception, reasoning, decision-making and action, and is usually regarded as an "intelligent" entity platform capable of independent thinking and action. The intelligent agent platform may adapt to complex environments by means of perception, learning, and planning, etc., and interact with the outside world. The intelligent agent platform may be applied in the field of artificial intelligence technologies such as deep learning, natural language processing, etc. How to simplify a service provision logic and efficiently provide users with demand services relying on the intelligent agent platform has become a key concern.

SUMMARY

According to a first aspect of the present disclosure, a method of providing a service for a large model scenario is provided. The method, applied to an intelligent agent platform, includes: in response to receiving service request information from a first interface of the intelligent agent platform, invoking a key information extraction service in the intelligent agent platform, and performing key information extraction on the service request information to obtain first key information; in a case where a number of first key information is greater than a preset number, invoking an information merging service in the intelligent agent platform, and determining second key information from a plurality of first key information; and invoking a service content determination service in the intelligent agent platform, and determining a first target service content based on the second key information.

According to a second aspect of the present disclosure, an apparatus for providing a service for a large model scenario is provided. The apparatus, applied to an intelligent agent platform, includes: at least one processor; and a memory communicatively coupled to the at least one processor; the at least one processor is configured to, in response to receiving service request information from a first interface of the intelligent agent platform, invoke a key information extraction service in the intelligent agent platform, and perform key information extraction on the service request information to obtain first key information; in a case where a number of first key information is greater than a preset number, invoke an information merging service in the intelligent agent platform, and determining second key information from a plurality of first key information; and invoke a service content determination service in the intelligent agent platform, and determine a first target service content based on the second key information.

According to a third aspect of the present disclosure, a non-transitory computer-readable storage medium with computer instructions stored thereon is provided, in which the computer instructions are configured to cause the computer to perform: in response to receiving service request information from a first interface of the intelligent agent platform, invoking a key information extraction service in the intelligent agent platform, and performing key information extraction on the service request information to obtain first key information; in a case where a number of first key information is greater than a preset number, invoking an information merging service in the intelligent agent platform, and determining second key information from a plurality of first key information; and invoking a service content determination service in the intelligent agent platform, and determining a first target service content based on the second key information.

BRIEF DESCRIPTION OF THE DRAWINGS

The accompanying drawings are used for a better understanding of the solution and do not constitute a limitation of the present disclosure.

FIG. 1 is a flowchart illustrating a method of providing a service for a large model scenario according to an embodiment of the present disclosure;

FIG. 2 is a flowchart illustrating a method of providing a service for a large model scenario according to another embodiment of the present disclosure;

FIG. 3 is a flowchart illustrating a method of providing a service for a large model scenario according to yet another embodiment of the present disclosure;

FIG. 4 is a diagram illustrating an architecture of an apparatus of providing a service for a large model scenario according to an embodiment of the present disclosure;

DETAILED DESCRIPTION

Figure 5:
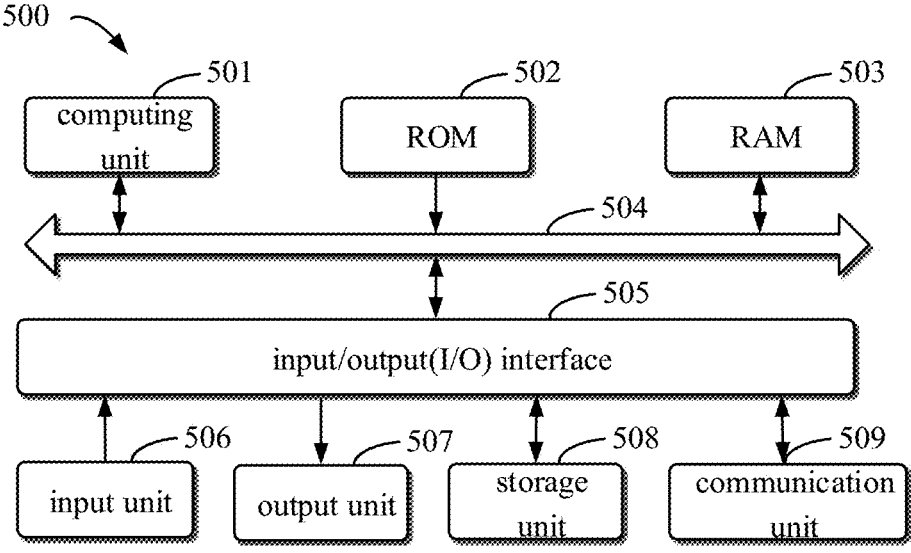
FIG. 5 is a block diagram illustrating an electronic device for implementing a method of providing a service for a large model scenario according to an embodiment of the present disclosure.

Exemplary embodiments of the present disclosure are described hereinafter in conjunction with the accompanying drawings, which include various details of embodiments of the present disclosure in order to aid in understanding, and which should be considered exemplary only. Accordingly, those ordinary skilled persons in the art should recognize that various changes and modifications can be made to embodiments described herein without departing from the scope and spirit of the present disclosure. Similarly, descriptions of well-known features and structures are omitted from the following description for the sake of clarity and brevity.

Embodiments of the present disclosure relate to the technical field of artificial intelligence such as deep learning, natural language processing, and large model.

Artificial Intelligence (AI), abbreviated as AI, is a new technical science that researches and develops theory, method, technology, and application systems for simulating, extending, and expanding human intelligence.

Deep Learning is learning intrinsic laws and levels of representation of sample data, and information gained from these learning processes can be of great help in interpreting data such as text, images, and sounds. The ultimate goal of the deep learning is to enable machines to have analytical learning capabilities like a human being and be able to recognize the data such as the text, the images and the sounds.

Natural Language Processing (NLP) is an important direction in the field of computer science and artificial intelligence. The NLP studies various theories and methods that may realize effective communication between human and computers in natural language.

Large model is short for large language model, which refers to machine learning models with a large number of parameters and complex structures obtained by training based on large-scale corpora. These models may be applied to deal with large-scale data and complex problems.

It is noted that processing of user's personal information, such as, collection, storage, use, handling, transmission, provision and disclosure, involved in the technical solution of the present disclosure is in compliance with relevant laws and regulations and does not violate public order and morals.

A method and an apparatus of providing a service for a large model scenario, an electronic device, and a storage medium provided in the present disclosure are described below with reference to the accompanying drawings.

It is noted that an execution body of the method of providing a service for a large model scenario in the present embodiment is an apparatus of providing a service for a large model scenario. The apparatus may be realized by way of software and/or hardware, and may be configured in an electronic device. The electronic device may include, but is not limited to, a terminal, a server side, etc.

FIG. 1 is a flowchart illustrating a method of providing a service for a large model scenario according to an embodiment of the present disclosure.

As shown in FIG. 1, the method of providing a service for a large model scenario includes following steps S101 to S103.

At step S101, in response to receiving service request information from a first interface of the intelligent agent platform, a key information extraction service in the intelligent agent platform is invoked, and key information extraction is performed on the service request information to obtain first key information.

The intelligent agent platform is a computer program or system with abilities of perception, reasoning, decision-making and action, and is usually regarded as an "intelligent" entity platform capable of independent thinking and action. The intelligent agent platform may adapt to complex environments by means of perception, learning, and planning, etc., and interact with the outside world. The intelligent agent platform may be applied to artificial intelligence, robotics, virtual reality, gaming, automatic control, information retrieval, recommendation systems, natural language processing, and other fields.

The method of providing a service for a large model scenario in embodiments of the present disclosure may be applied to the intelligent agent platform. That is, a user may interact with the intelligent agent platform to enable the intelligent agent platform to accurately and efficiently provide the user with corresponding service content.

In an embodiment of the present disclosure, the intelligent agent platform may provide a plurality of data transmission interfaces to interact with the user with information based on the data transmission interfaces, and an interface configured to receive the service request information of the user among the plurality of data transmission interfaces is the first interface.

The service request information refers to information made by the user to the intelligent agent platform, and is configured to request to obtain information of the service content that satisfying demands of the user from the intelligent agent platform. The service request information may be, for example, "check today's weather", "Yunnan travel guide", etc., without limitation thereon.

The intelligent agent platform may include a plurality of services, each of which may have a corresponding business function, and the plurality of services may operate jointly to provide the target service content corresponding to the service request information. A service with the key information extraction function among the plurality of services is the key information extraction service.

The first key information is information with importance, core content or main viewpoint in the service request information. For example, the service request information is "what is today's weather in Beijing", the first key information may be, for example, "today's weather in Beijing", without limitation thereon.

In some embodiments, invoking the key information extraction service in the intelligent agent platform, and performing the key information extraction on the service request information to obtain the first key information may include invoking the key information extraction service in the intelligent agent platform (the key information extraction service includes: a pre-trained key information extraction model, or a keyword extraction component, without limitation thereon), and then performing the key information extraction on the service request information based on the pre-trained key information extraction model in the key information extraction service to obtain the first key information, or, extracting keywords from the service request information based on the keyword extraction component in the key information extraction service, and taking a plurality of extracted keywords together as the first key information, without limitation thereon.

Alternatively, in some embodiments, invoking the key information extraction service in the intelligent agent platform, and performing the key information extraction on the service request information to obtain the first key information may include obtaining the first key information output from a large model by inputting fourth prompt information corresponding to the key information extraction service and the service request information into the large model.

The fourth prompt information is pre-generated prompt information for the key information extraction service in the intelligent agent platform, and the fourth prompt information is configured to guide the large model to extract the key information from the inputted service request information.

In an embodiment of the present disclosure, the fourth prompt information corresponding to the key information extraction service and the service request information may be input into the large model together to obtain the first key information output by the large model, thus combining the large model to improve a generation efficiency of the first key information and effectively improving an extraction effect of the first key information.

For example, the service request inputted into the large model may be, for example, "what are fun places in Hangzhou", then the fourth prompt information may be inputted into the large model to obtain the output of the large model: "Hangzhou travel guide" as the first key information, without limitation thereon.

At step S102, in a case where a number of first key information is greater than a preset number, an information merging service in the intelligent agent platform is invoked, and second key information is determined from a plurality of first key information.

In an embodiment of the present disclosure, after invoking the key information extraction service in the intelligent agent platform, and performing the key information extraction on the service request information to obtain the first key information, the number of first key information may be determined (it is noted that one first key information may be extracted from one service request information) and in a case where the number of first key information is greater than the preset number, the information merging service in the intelligent agent platform is invoked, and the second key information is determined from the plurality of first key information.

It is noted that, for the first key information corresponding to similar service request information of different users, or for the first key information corresponding to service request information initiated multiple times by the same user (e.g., the first key information corresponding to a certain service request information is to inquire about today's weather in Beijing, and the first key information corresponding to another service request information is whether or not there is rain in Beijing today), both of them may be implemented based on the same target service content, all can be realized based on the same target service content (e.g., weather query service). Thus, in a case where the number of first key information is greater than the preset number, the plurality of first key information may be merged, which may, in the subsequent service provision process, reduce meaningless operations, save data processing resources and enhance a service provision efficiency.

The preset number may be, for example, 1, without limitation thereon.

Among the plurality of services of the intelligent agent platform, a service having an information merging function is the information merging service.

Key information filtered from the plurality of first key information based on the information merging service in the intelligent agent platform is the second key information.

In an embodiment of the present disclosure, the information merging service in the intelligent agent platform is invoked (the information merging service may include a pre-trained text fusing model, an information merging component, etc., and without limitation thereon), and then, the second key information may be obtained by performing text fusing on the plurality of first key information based on the pre-trained text fusing model in the information merging service, or, the second key information may be obtained by performing information merging on every two first key information based on the information merging component in the information merging service, without limitation thereon.

At step S103, a service content determination service in the intelligent agent platform is invoked, and a first target service content is determined based on the second key information.

In an embodiment of the present disclosure, after invoking the information merging service in the intelligent agent platform to determine the second key information from the plurality of first key information, the service content determination service in the intelligent agent platform may be invoked to determine the first target service content based on the second key information.

In an embodiment of the present disclosure, the target service content includes at least one of: a script file for implementing a target service, a service for implementing the target service, or, a plug-in for implementing the target service. Since the target service content is obtained by pre-compiling, thus the intelligent agent platform may directly provide to the corresponding user the script file for implementing the target service, or the service for implementing the target service, or the plug-in for implementing the target service, thus being able to satisfy diversified needs of the user.

Target service content determined based on the second key information that matches each second key information is the first target service content.

In an embodiment of the present disclosure, the intelligent agent platform includes a plurality of initial service contents, each initial service content has corresponding initial descriptive information.

The initial descriptive information may be, for example, functional descriptive information, parameters, etc., of the initial service content, without limitation thereon.

A service having the service content determination function among the plurality of services of the intelligent agent platform is the service content determination service.

In some embodiments, invoking the service content determination service in the intelligent agent platform and determining the first target service content based on the second key information may include invoking the service content determination service in the intelligent agent platform, determining a similarity value between each of the initial descriptive information and the service request information, and taking the initial service content corresponding to the similarity with the largest value as the first target service content.

In other embodiments, invoking the service content determination service in the intelligent agent platform and determining the first target service content based on the second key information may also include inputting the second key information into a pre-trained classification model (in which the pre-trained classification model is obtained by pre-training based on a mapping relationship between the key information and the target service content), to obtain the first target service content outputted by the pre-trained classification model, without limitation thereon.

Alternatively, in some embodiments, invoking the service content determination service in the intelligent agent platform, and determining a second target service content based on the second key information includes: obtaining a similarity between the second key information and each initial descriptive information output by a large model, by inputting the second key information, second prompt information corresponding to the service content determination service, and the initial descriptive information into the large model; determining a similarity with a maximum value from a plurality of similarities; and determining the first target service content based on the similarity with the maximum value and the plurality of initial service contents. Thus, an efficiency of determining the similarity between the second key information and each initial descriptive information may be improved jointly with the large model. Then the similarity with the maximum value is determined from the plurality of similarities. Since the initial service content corresponding to the similarity with the maximum value is the most suitable for the second key information, in the case where the first target service content is determined jointly with the similarity with the maximum value and the plurality of initial service contents, an effect of the determining the first target service content subsequently may be effectively safeguarded.

The second prompt information is prompt information pre-generated for the service content determination service in the intelligent agent platform. The second prompt information is configured to guide the large model in determining the corresponding target service content based on the inputted second key information.

That is, in an embodiment of the present disclosure, the similarity between the second key information and each initial descriptive information output by the large model may be obtained, by inputting the second key information, second prompt information corresponding to the service content determination service, and the initial descriptive information into the large model.

In an embodiment of the present disclosure, after obtaining the similarity between the second key information and each initial descriptive information output by the large model, the similarity with the maximum value from the plurality of similarities may be determined, and the first target service content is determined based on the similarity with the maximum value and the plurality of initial service contents.

Alternatively, in some embodiments, determining the first target service content based on the similarity with the maximum value and the plurality of initial service contents may include: in response to the similarity with the maximum value being greater than or equal to a similarity threshold, taking an initial service content described by initial descriptive information corresponding to the similarity with the maximum value as the first target service content; or, in response to the similarity with the maximum value being less than the similarity threshold, obtaining the first target service content matching with the second key information from other platform based on a second interface of the intelligent agent platform. Therefore, it may indicate that, in the case where the similarity with the maximum value is greater than or equal to the similarity threshold, the initial service content corresponding to the similarity with the maximum value is adapted to demands of the user, thus effectively satisfying service demands of the user when taking the initial service content corresponding to the similarity with the maximum value as the first target service content, and in the case where the similarity with the maximum value is less than the similarity threshold, it is determined that there is no initial service content on the intelligent agent platform adapted to the demands of the user locally, the first target service content of other platform may be received based on the second interface, thus effectively satisfying the service demands of the user.

The second interface of the intelligent agent platform may be used for performing information interaction with other platform.

That is, in an embodiment of the present disclosure, the similarity with the maximum value may be compared to a predetermined similarity threshold, and in response to the similarity with the maximum value being greater than or equal to the similarity threshold, the initial service content described by the initial descriptive information corresponding to the similarity with the maximum value is taken as the first target service content.

In an embodiment of the present disclosure, in response to the similarity with the maximum value being less than the similarity threshold, the first target service content matching with the second key information from other platform may be obtained based on the second interface of the intelligent agent platform, that is, the intelligent agent platform may access the first target service content matching the second key information of other platform based on the second interface.

In an embodiment of the present disclosure, in response to receiving the service request information from the first interface of the intelligent agent platform, invoking the key information extraction service in the intelligent agent platform, and performing the key information extraction on the service request information to obtain the first key information; in a case where the number of the first key information is greater than the preset number, invoking the information merging service in the intelligent agent platform, and determining the second key information from the plurality of first key information; and invoking the service content determination service in the intelligent agent platform, and determining the first target service content based on the second key information. Thus, the first target service content matching the service request information may be provided based on a plurality of services within the intelligent agent platform, a logic of determining the target service content may be effectively simplified, and further the first target service content may be efficiently and accurately determined.

FIG. 2 is a flowchart illustrating a method of providing a service for a large model scenario according to another embodiment of the present disclosure;

As shown in FIG. 2, the method of providing a service for a large model scenario includes following steps S201 to S207.

At step S201, in response to receiving service request information from a first interface of the intelligent agent platform, a key information extraction service in the intelligent agent platform is invoked, and key information extraction is performed on the service request information to obtain first key information.

The step S201 can be described and illustrated specifically in the above embodiments, and will not be repeated herein.

At step S202, in a case where a number of first key information is greater than a preset number, a reception timestamp of the service request information corresponding to each of a plurality of first key information is determined.

In an embodiment of the present disclosure, after invoking the key information extraction service in the intelligent agent platform, and performing the key information extraction on the service request information to obtain the first key information, the number of first key information may be determined (it is noted that one first key information may be extracted from one service request information), and in a case where the number of first key information is greater than the preset number, the reception timestamp of the service request information corresponding to each of the plurality of first key information is determined.

At step S203, the plurality of first key information are sorted according to the reception timestamps.

In embodiments of the present disclosure, after determining the reception timestamp of the service request information corresponding to each of the plurality of first key information, the plurality of first key information may be sorted according to an order of times described by the plurality of reception timestamps, and then, a subsequent method of providing a service for a large model scenario may be triggered to be executed based on the plurality of first key information obtained from the sorting, which may be referred to a subsequent embodiment, and will not be repeated herein.

At step S204, an information merging result output from a large model is obtained by inputting first prompt information corresponding to the information merging service, and every two adjacent first key information of the plurality of first key information resulting from the sorting into the large model.

The information merging result is configured to indicate whether or not to merge the two adjacent first key information.

The first prompt information is pre-generated prompt information for the information merging service in the intelligent agent platform. The first prompt information is configured to guide the large model in determining the information merging result of the inputted two adjacent first key information.

For example, the two adjacent first key information inputted into the large model may be, for example, "restaurant recommendation" and "travel guide", respectively, and then the first key information may be input into the large model to obtain a "merge" output from the large model as the information merging result, or, the two adjacent first key information inputted into the large model may be, for example, "writing an essay" and "writing an article", respectively, and then the first key information may be input into the large model to obtain a "not merged" output from the large model as the information merging result, without limitation thereon.

At step S205, the second key information is determined from the plurality of first key information based on the information merging result.

In an embodiment of the present disclosure, after obtaining the information merging result output from the large model by inputting the first prompt information corresponding to the information merging service, and every two adjacent first key information of the plurality of first key information resulting from the sorting into the large model, the second key information may be determined from the plurality of first key information based on the information merging result.

In some embodiments, determining the second key information from the plurality of first key information based on the information merging result may be that, in a case where the information merging result is merging, any one first key information of the two adjacent first key information is taken as the second key information, until traversal of all the first key information obtained from the sorting is completed, and the first key information selected in each merging operation is taken as the second key information.

In an embodiment of the present disclosure, information merging is performed on the first key information corresponding to a plurality of similar service request information input by the same user. Since the similar service request information may match the same target service content, by performing the information merging on the first key information corresponding to the plurality of similar service request information, the amount of subsequent data processing may be effectively reduced, and data processing resources of the intelligent agent platform may be effectively saved, and a service provision efficiency of the intelligent agent platform may be assisted to be improved to a certain extent.

Alternatively, in some embodiments, determining the second key information from the plurality of first key information based on the information merging result may include, in response to the information merging result indicating merging the two adjacent first key information, deleting first key information sorted first among the two adjacent first key information, and taking retained first key information among the two adjacent first key information as the second key information, or in response to the information merging result indicating not merging the two adjacent first key information, taking the two adjacent first key information together as the second key information.

That is, in an embodiment of the present disclosure, all of the first key information can be traversed, and in response to the information merging result indicating merging the two adjacent first key information, the first key information sorted first among the two adjacent first key information is deleted, thus effectively ensuring freshness of the first key information and avoiding omission of updated information, or, in response to the information merging result indicating not merging the two adjacent first key information, the two adjacent first key information together are taking as the second key information, thus ensuring comprehensiveness of the second key information, enabling the second key information to fully characterize the service request information of the user, and after traversal of all the first key information is ended and completed, the remaining first key information is the second key information.

At step S206, the service content determination service in the intelligent agent platform is invoked, and a first target service content is determined based on the second key information.

The step S206 can be described and illustrated specifically in the above embodiments, and will not be repeated herein.

At step S207: in a case where a number of first key information is less than or equal to a preset number, the service content determination service is invoked, and a third target service content is determined based on the first key information.

The preset number may, for example, be 1, and without limitation thereon.

The target service content directly determined based on the first key information that matches the first key information is the third target service content.

That is, in an embodiment of the present disclosure, in a case that the number of the first key information is 1, the first key information does not need to be merged, thus the service content determination service in the intelligent agent platform may be invoked directly, and the first target service content may be determined based on the second key information. Thus, in the case where the number of first key information is less than or equal to the preset number, ineffective invocation of the information merging service may be avoided, thus reducing meaningless operations, and the service content determination service can be invoked directly to determine the first target service content based on the second key information, thus effectively improving an efficiency of determination of the first target service content.

In an embodiment of the present disclosure, invoking the service content determination service, and determining the third target service content based on the first key information may include: obtaining a similarity between the second key information and each initial descriptive information output by a large model, by inputting the first key information, the second prompt information corresponding to the service content determination service, and the initial descriptive information into the large model, determining a similarity with a maximum value from a plurality of similarities; and determining the third target service content based on the similarity with the maximum value and the plurality of initial service contents.

In an embodiment of the present disclosure, determining the third target service content based on the similarity with the maximum value and the plurality of initial service contents may include: in response to the similarity with the maximum value being greater than or equal to a similarity threshold, taking an initial service content described by initial descriptive information corresponding to the similarity with the maximum value as the third target service content, or, in response to the similarity with the maximum value being less than the similarity threshold, obtaining the third target service content matching with the first key information from other platform based on a second interface of the intelligent agent platform.

In an embodiment of the present disclosure, in response to receiving the service request information from the first interface of the intelligent agent platform, the key information extraction service in the intelligent agent platform is invoked, and the key information extraction is performed on the service request information to obtain the first key information, in a case where the number of first key information is greater than the preset number, the reception timestamp of the service request information corresponding to each of the plurality of first key information is determined, the plurality of first key information is sorted according to the reception timestamps, the information merging result output from the large model is obtained by inputting the first prompt information corresponding to the information merging service and every two adjacent first key information of the plurality of first key information resulting from the sorting into the large model, the second key information is determined from the plurality of first key information based on the information merging result. Thus, with performing information merging on the first key information corresponding to the similar service request information, the amount of subsequent data processing may be effectively reduced, and data processing resources of the intelligent agent platform may be effectively saved, and a service provision efficiency of the intelligent agent platform may be assisted to be improved to a certain extent. And then with invoking the service content determination service in the intelligent agent platform, and determining the first target service content based on the second key information, in a case where the number of first key information is less than or equal to the preset number, invoking the service content determination service, and determining the third target service content based on the first key information, ineffective invocation of the information merging service may be avoided, and meaningless operations may be reduced, further the service content determination service may be invoked directly to determine the first target service content based on the second key information, an efficiency of determination of the first target service content may be effectively improved.

FIG. 3 is a flowchart illustrating a method of providing a service for a large model scenario according to another embodiment of the present disclosure.

As shown in FIG. 3, the method of providing a service for a large model scenario includes following steps S301 to S303.

At step S301, in response to receiving service request information from a first interface of the intelligent agent platform and receiving candidate descriptive information from a third interface of the intelligent agent platform, a function matching service in the intelligent agent platform is invoked, and the service request information and the candidate descriptive information are processed to determine a function matching result.

The candidate descriptive information is configured to describe the candidate service content. The candidate descriptive information may include, for example, a name of a script file, a portion of the script file, functional descriptive information, etc., of the candidate service content which is provided for the user, without limitation thereon.

A data transmission interface that is configured to receive the candidate descriptive information of the user among the plurality of data transmission interfaces of the intelligent agent platform is the third interface.

The service having a function matching function among the plurality of service of the intelligent agent platform is the function matching service.

The function matching result is configured to describe a match situation between a first function supported by a candidate service content and a second function demanded by the service request information. The first function is a function supported by the candidate service content on the user side, and the second function is a function that satisfies demands of the user.

That is, in response to receiving the service request information from the first interface of the intelligent agent platform and receiving the candidate descriptive information from the third interface of the intelligent agent platform, the user side has a candidate service content associated with the service request, and thus the user may provide the service request information and the service descriptive information of the candidate service content to the intelligent agent platform, and the intelligent agent platform invokes a function matching service to further determine whether the candidate service content is adapted to the service request information.

Alternatively, in some embodiments, invoking the function matching service in the intelligent agent platform, and processing the service request information and the candidate descriptive information to determine the function matching result may include obtaining the function matching result output from a large model by inputting third prompt information corresponding to the function matching service, the service request information and the initial descriptive information into the large model. Thus, a matching efficiency and a matching effect between functions corresponding to the service request information and the initial descriptive information may be improved jointly with the large model, and accuracy and referability of the function matching result may be effectively improved.

The third prompt information is prompt information pre-generated for the function matching service in the intelligent agent platform. The third prompt information is configured to guide the large model to match the functions corresponding to the input service request information and the candidate descriptive information respectively.

For example, the service request information input to the large model is: "I want to store my text embedding with a vector database", and the candidate descriptive information is: "The Milvus Vector Database is designed specifically for vector query and retrieval and is capable of establishing indexes for trillion level vector data. Unlike existing relational databases, which are mainly configured to process structured data, Milvus is designed at the bottom level to process vectors converted from various unstructured data". Then, the third prompt information may be input to the large model to get "match" output from the large model as the function matching result, without limitation thereon.

At step S302, a second target service content is determined based on the function matching result.

In an embodiment of the present disclosure, after invoking the function matching service in the intelligent agent platform, and processing the service request information and the candidate descriptive information to determine the function matching result, in response to receiving the service request information from the first interface of the intelligent agent platform and receiving the candidate descriptive information from the third interface of the intelligent agent platform, the second target service content may be determined based on the function matching result. Thus, whether the user request information and the candidate service content on the user side match is accurately determined based on the function matching service in the intelligent agent platform, which can accurately provide the user with the adapted second target service content based on the function matching result.

Alternatively, in some embodiments, determining the second target service content based on the function matching result includes: in response to the function matching result indicating that the first function matches the second function, taking the candidate service content corresponding to the function matching result as the second target service content; and in response to the function matching result indicating that the first function does not match the second function, invoking the key information extraction service, and performing the key information extraction on the service request information to obtain the first key information, and invoking the service content determination service, and determining the second target service content based on the first key information.

That is, an embodiment of the present disclosure may be that, in response to the function matching result indicating that the first function matches the second function, the candidate service content corresponding to the function matching result on the user side is directly taken as the second target service content, thus improving referrability of the second target service content, or, in response to the function matching result indicating that the first function does not match the second function, the key information extraction service is invoked, and the key information extraction is performed on the service request information to obtain the first key information, and the service content determination service is invoked, and the second target service content is determined based on the first key information, thus, in the case where the candidate service content on the user side does not match the demands of the user, accurately and efficiently determining the second target service content based on the key information extraction service and the service content determination service in the intelligent agent platform, and satisfying demands of the user for the service content.

It is noted that in an embodiment of the present disclosure, a specific explanatory descriptive of invoking the key information extraction service, and performing the key information extraction on the service request information to obtain the first key information, and invoking the service content determination service, and determining the second target service content based on the first key information may be referred to in the above embodiment, and will not be repeated herein.

At step S303, target information is obtained by processing the service request information based on the target service content.

In an embodiment of the present disclosure, the target service content may include a first target service content, a second target service content, and a third target service content.

In an embodiment of the present disclosure, after determining the target service content, the service request information may be processed based on the target service content to obtain the target information demanded by the user, thus, the intelligent agent platform may directly process the service request information based on the target service content and provide the target information obtained from the processing to the user (e.g., displaying the target information), which may facilitate the user to be informed of the target information corresponding to the service request information.

For example, the target service content is: weather query component", and the service request information is: "querying weather in Beijing", thus, the weather in Beijing may be queried based on the weather query component, and "the weather in Beijing is sunny" is obtained as the target information.

In an embodiment of the present disclosure, the intelligent agent platform may also support other services (functions), for example, receiving a part of a script file inputted by a user, providing the user with the entire matching script file, further determining a service that is compatible with the service request information of the user from a certain service, etc., without limitation thereon.

In an embodiment of the present disclosure, in response to receiving the service request information from the first interface of the intelligent agent platform and receiving the candidate descriptive information from the third interface of the intelligent agent platform, the function matching service in the intelligent agent platform is invoked, and the service request information and the candidate descriptive information are processed to determine the function matching result, and the second target service content is determined based on the function matching result, thus accurately determining whether the user request information and the candidate service content on the user's side match based on the function matching service in the intelligent agent platform, capable of accurately providing the user with the adapted second target service content based on the function matching result. Then, the target information is obtained by processing the service request information based on the target service content, thus, the intelligent agent platform may directly process the service request information based on the target service content and provide the target information obtained from the processing to the user (e.g., displaying the target information), so as to facilitate the user to be informed of the target information corresponding to the service request information.

FIG. 4 is a diagram illustrating an architecture of an apparatus of providing a service for a large model scenario according to an embodiment of the present disclosure.

As shown in FIG. 4, the apparatus 40 for providing a service for a large model scenario, applied to an intelligent agent platform, includes a first invoking module 401, a second invoking module 402, and a third invoking module 403.

The first invoking module 401 is configured to, in response to receiving service request information from a first interface of the intelligent agent platform, invoke a key information extraction service in the intelligent agent platform, and perform key information extraction on the service request information to obtain first key information.

The second invoking module 402 is configured to, in a case where a number of first key information is greater than a preset number, invoke an information merging service in the intelligent agent platform, and determine second key information from a plurality of first key information.

The third invoking module 403 is configured to invoke a service content determination service in the intelligent agent platform, and determine a first target service content based on the second key information.

In some embodiments of the present disclosure, the second invoking module 402 is further configured to:

determine a reception timestamp of the service request information corresponding to each of a plurality of first key information;

sort the plurality of first key information according to the reception timestamps;

obtain an information merging result output from a large model by inputting first prompt information corresponding to the information merging service, and every two adjacent first key information of the plurality of first key information resulting from the sorting into the large model, in which the information merging result is configured to indicate whether or not to merge the two adjacent first key information; and determine the second key information from the plurality of first key information based on the information merging result.

In some embodiments of the present disclosure, the second invoking module 402 is further configured to:

in response to the information merging result indicating merging the two adjacent first key information, delete first key information sorted first among the two adjacent first key information, and take retained first key information among the two adjacent first key information as the second key information; and in response to the information merging result indicating not merging the two adjacent first key information, take the two adjacent first key information together as the second key information.

In some embodiments of the present disclosure, the intelligent agent platform includes a plurality of initial service contents, each initial service content has corresponding initial descriptive information.

The third invoking module 403 is further configured to:

obtain a similarity between the second key information and each initial descriptive information output by a large model, by inputting the second key information, second prompt information corresponding to the service content determination service, and the initial descriptive information into the large model;

determine a similarity with a maximum value from a plurality of similarities; and determine the first target service content based on the similarity with the maximum value and the plurality of initial service contents.

In some embodiments of the present disclosure, the third invoking module 403 is further configured to:

in response to the similarity with the maximum value being greater than or equal to a similarity threshold, take an initial service content described by initial descriptive information corresponding to the similarity with the maximum value as the first target service content; or in response to the similarity with the maximum value being less than the similarity threshold, obtain the first target service content matching with the second key information from other platform based on a second interface of the intelligent agent platform.

In some embodiments of the present disclosure, the apparatus 40 for providing a service for a large model scenario further includes a fourth invoking module, and a determining module.

The fourth invoking module is configured to, in response to receiving candidate descriptive information from a third interface of the intelligent agent platform, invoke a function matching service in the intelligent agent platform, and process the service request information and the candidate descriptive information to determine a function matching result, in which the function matching result is configured to describe a match situation between a first function supported by a candidate service content and a second function demanded by the service request information, and the candidate descriptive information is configured to describe the candidate service content.

The determining module is configured to determine a second target service content based on the function matching result.

In some embodiments of the present disclosure, the determining module is further configured to:

in response to the function matching result indicating that the first function matches the second function, take the candidate service content corresponding to the function matching result as the second target service content; and in response to the function matching result indicating that the first function does not match the second function, invoke the key information extraction service, and perform the key information extraction on the service request information to obtain the first key information, and invoke the service content determination service, and determine the second target service content based on the first key information.

In some embodiments of the present disclosure, the determining module is further configured to:

obtain the function matching result output from a large model by inputting third prompt information corresponding to the function matching service, the service request information and the initial descriptive information into the large model.

In some embodiments of the present disclosure, the first invoking module 401 is further configured to:

obtain the first key information output from a large model by inputting fourth prompt information corresponding to the key information extraction service and the service request information into the large model.

In some embodiments of the present disclosure, the apparatus 40 for providing a service for a large model scenario further includes a fifth invoking module.

The fifth invoking module is configured to, in a case where a number of first key information is less than or equal to a preset number, invoke the service content determination service, and determine a third target service content based on the first key information.

In some embodiments of the present disclosure, the apparatus 40 for providing a service for a large model scenario further includes a processing module.

The processing module is configured to obtain target information by processing the service request information based on the target service content.

In some embodiments of the present disclosure, the target service content includes at least one of:

a script file for implementing a target service;

a service for implementing the target service; or a plug-in for implementing the target service.

It is noted that the method of providing a service for a large model scenario described above is also applicable to the apparatus for providing a service for a large model scenario of the present embodiment, and will not be repeated herein.

In an embodiment of the present disclosure, in response to receiving the service request information from the first interface of the intelligent agent platform, invoking the key information extraction service in the intelligent agent platform, and performing the key information extraction on the service request information to obtain the first key information; in a case where the number of the first key information is greater than the preset number, invoking the information merging service in the intelligent agent platform, and determining the second key information from the plurality of first key information; and invoking the service content determination service in the intelligent agent platform, and determining the first target service content based on the second key information. Thus, the first target service content matching the service request information may be provided based on a plurality of services within the intelligent agent platform, a logic of determining the target service content may be effectively simplified, and further the first target service content may be efficiently and accurately determined.

According to embodiments of the present disclosure, an electronic device, a readable storage medium, and a computer program product are also provided.

Referring to FIG. 5, which is a block diagram illustrating an electronic device 500 for implementing a method of providing a service for a large model scenario according to an embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable non-intrusive flexible loads aggregation characteristic identification devices, and other similar computing devices. The components shown herein, their connections and relations, and their functions are merely examples, and are not intended to limit the implementation of the disclosure described and/or required herein.

As shown in FIG. 5, the device 500 includes a computing unit 501, configured to execute various appropriate actions and processes according to a computer program stored in a read-only memory (ROM) 502 or loaded from a storage unit 508 to a random access memory (RAM) 503. In the RAM 503, various programs and data required for the device 500 may be stored. The computing unit 501, the ROM 502 and the RAM 503 may be connected with each other by a bus 504. An input/output (I/O) interface 505 is also connected to the bus 504.

The device 500 are connected to an I/O interface 505, and includes: an input unit 506, for example, a keyboard, a mouse; an output unit 507, for example, various types of displays, speakers; a storage unit 508, for example, a magnetic disk, an optical disk; and a communication unit 509, for example, a network card, a modem, a wireless transceiver. The communication unit 509 allows the device 500 to exchange information/data through a computer network such as internet and/or various types of telecommunication networks and other devices.

The computing unit 501 may be various types of general and/or dedicated processing components with processing and computing ability. Some examples of a computing unit 501 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 501 executes various methods and processes as described above, for example, a method of providing a service for a large model scenario. For example, in some embodiments, the method of providing a service for a large model scenario may be further implemented as a computer software program, which is physically contained in a machine readable medium, such as the storage unit 508. In some embodiments, a part or all of the computer program may be loaded and/or installed on the device 500 via the ROM 502 and/or a communication unit 509. When the computer program is loaded on the RAM 503 and executed by the computing unit 501, one or more steps in the method of providing a service for a large model scenario as described above may be performed. Alternatively, in other embodiments, the computing unit 501 may be configured to the method of providing a service for a large model scenario in other appropriate ways (for example, by virtue of a firmware).

In context, various implementation modes of systems and technologies as described above may be implemented in a digital electronic circuit system, an integrated circuit system, a field programmable gate array (FPGA), a dedicated application specific integrated circuit (ASIC), a system on a chip (SOC), a complex programmable logic device (CPLD), a computer hardware, a firmware, a software, and/or combinations thereof. The implementations may include: implemented in one or more computer programs. The one or more computer programs may be executed and/or interpreted on a programmable system including at least one programmable processor. The programmable processor may be a dedicated or general-purpose programmable processor, may receive data and instructions from a storage system, at least one input device, and at least one output device, and transmit the data and the instructions to the storage system, the at least one input device, and the at least one output device.

Program codes configured to execute a method in the present disclosure may be written with one or any combination of multiple programming languages. These program codes may be provided to a processor or a controller of a general-purpose computer, a dedicated computer, or other programmable apparatuses for data processing so that the function/operation specified in the flowchart and/or block diagram may be implemented when the program codes are executed by the processor or controller. The computer codes may be executed completely or partly on the machine, as an independent software package, executed partly on the machine and executed partly on the remote machine, or executed completely on the remote machine or server.

In the context of the present disclosure, a machine-readable medium may be a tangible medium that may contain or store a program intended for use in or in conjunction with an instruction execution system, an apparatus or a device. The machine-readable medium may be a machine-readable signal medium or a machine-readable storage medium. The machine-readable medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM (an EPROM or a flash memory), an optical fiber device, and a compact disc read-only memory (CD-ROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input or a tactile input).

Systems and technologies described herein may be implemented in a computing system (for example, as a data server) including a background component, or a computing system (for example, an application server) including a middleware component, or a computing system including a front-end component (for example, a user computer with a graphical user interface or a web browser, and the user may interact with implementations of the systems and technologies described herein via the graphical user interface or the web browser), or in a computing system including any combination of the background component, the middleware component, or the front-end component. Components of the system may be interconnected by any form or medium of digital data communication (for example, a communication network). Examples of the communication network include a local area network (LAN), a wide area network (WAN), an Internet, and a blockchain network.

The computer system may include a client and a server. The client and the server are generally far away from each other and generally interact with each other through a communication network. A relationship between the client and the server is generated by computer programs that run on the corresponding computer and have a client-server relationship with each other. A server may be a cloud server, also referred to as a cloud computing server or a cloud host, which is a host product in a cloud computing service system to solve problems of difficult management and weak business scalability in a traditional physical host and a VPS service (virtual private server, or VPS for short). The server may also be a server of a distributed system, or a server in combination with a blockchain.

It should be noted that various forms of processes shown above may be used to reorder, add, or delete steps. For example, steps described in the present disclosure may be executed in parallel, sequentially, or in a different order, as long as the desired result of the technical solution disclosed in the present disclosure may be achieved, which will not be limited herein.

Additionally, the terms "first" and "second" are used for descriptive purposes only and are not to be construed as indicating or implying relative importance or implicitly specifying the number of technical features indicated. Thus, a feature defined with the terms "first", "second" may expressly or impliedly include at least one such feature. In the description of the present disclosure, "a plurality of" means at least two, such as two, three, etc., unless otherwise expressly and specifically limited. In the description of the present disclosure, the words "if" and "in case" may be construed as "upon" or "when . . . " or "in response to determining" or "in a case that . . . ".

The above specific implementations do not constitute a limitation of the protection scope of the disclosure. Those skilled in the art shall understand that various modifications, combinations and sub-combinations and substitutions may be made according to design requirements and other factors. Any modification, equivalent substitution and improvement, etc., made within the spirit and principle of the present disclosure shall be included within the protection scope of the present disclosure.

The invention claimed is:

1. A method of providing a service for a large model scenario, applied to an intelligent agent platform, comprising:

in response to receiving service request information from a first interface of the intelligent agent platform, invoking a key information extraction service in the intelligent agent platform, and performing key information extraction on the service request information to obtain first key information;

in a case where a number of first key information is greater than a preset number, invoking an information merging service in the intelligent agent platform, and determining second key information from a plurality of first key information; and invoking a service content determination service in the intelligent agent platform, and determining a first target service content based on the second key information;

wherein invoking the information merging service in the intelligent agent platform, and determining the second key information from the plurality of first key information comprises:

determining a reception timestamp of the service request information corresponding to each of a plurality of first key information;

sorting the plurality of first key information according to the reception timestamps;

obtaining an information merging result output from a large model by inputting first prompt information corresponding to the information merging service, and every two adjacent first key information of the plurality of first key information resulting from the sorting into the large model, wherein the information merging result is configured to indicate whether or not to merge the two adjacent first key information; and determining the second key information from the plurality of first key information based on the information merging result.

2. The method according to claim 1, wherein determining the second key information from the plurality of first key information based on the information merging result comprises:

in response to the information merging result indicating merging the two adjacent first key information, deleting first key information sorted first among the two adjacent first key information, and taking retained first key information among the two adjacent first key information as the second key information; or in response to the information merging result indicating not merging the two adjacent first key information, taking the two adjacent first key information together as the second key information.

3. The method according to claim 1, wherein the intelligent agent platform comprises a plurality of initial service contents, each initial service content has corresponding initial descriptive information;

wherein invoking the service content determination service in the intelligent agent platform, and determining a second target service content based on the second key information comprises:

obtaining a similarity between the second key information and each initial descriptive information output by a large model, by inputting the second key information, second prompt information corresponding to the service content determination service, and the initial descriptive information into the large model;

determining a similarity with a maximum value from a plurality of similarities; and determining the first target service content based on the similarity with the maximum value and the plurality of initial service contents.

4. The method according to claim 3, wherein determining the first target service content based on the similarity with the maximum value and the plurality of initial service contents comprises:

in response to the similarity with the maximum value being greater than or equal to a similarity threshold, taking an initial service content described by initial descriptive information corresponding to the similarity with the maximum value as the first target service content; or in response to the similarity with the maximum value being less than the similarity threshold, obtaining the first target service content matching with the second key information from other platform based on a second interface of the intelligent agent platform.

5. The method according to claim 1, further comprising:

in response to receiving candidate descriptive information from a third interface of the intelligent agent platform, invoking a function matching service in the intelligent agent platform, and processing the service request information and the candidate descriptive information to determine a function matching result, wherein the function matching result is configured to describe a match situation between a first function supported by a candidate service content and a second function demanded by the service request information, and the candidate descriptive information is configured to describe the candidate service content; and determining a second target service content based on the function matching result.

6. The method according to claim 5, wherein determining the second target service content based on the function matching result comprises:

in response to the function matching result indicating that the first function matches the second function, taking the candidate service content corresponding to the function matching result as the second target service content; and in response to the function matching result indicating that the first function does not match the second function, invoking the key information extraction service, and performing the key information extraction on the service request information to obtain the first key information, and invoking the service content determination service, and determining the second target service content based on the first key information.

7. The method according to claim 6, wherein invoking the function matching service in the intelligent agent platform, and processing the service request information and the candidate descriptive information to determine the function matching result comprises:

obtaining the function matching result output from a large model by inputting third prompt information corresponding to the function matching service, the service request information and the initial descriptive information into the large model.

8. The method according to claim 1, wherein invoking the key information extraction service in the intelligent agent platform, and performing the key information extraction on the service request information to obtain the first key information comprises:

obtaining the first key information output from a large model by inputting fourth prompt information corresponding to the key information extraction service and the service request information into the large model.

9. The method according to claim 1, further comprising:

in a case where a number of first key information is less than or equal to a preset number, invoking the service content determination service, and determining a third target service content based on the first key information.

10. The method according to claim 1, further comprising:

obtaining target information by processing the service request information based on the target service content.

11. The method according to claim 1, wherein the target service content comprises at least one of:

a script file for implementing a target service;

a service for implementing the target service; or a plug-in for implementing the target service.

12. An apparatus for providing a service for a large model scenario, applied to an intelligent agent platform, comprising:

at least one processor; and a memory communicatively coupled to the at least one processor;

wherein the at least one processor is configured to:

in response to receiving service request information from a first interface of the intelligent agent platform, invoke a key information extraction service in the intelligent agent platform, and perform key information extraction on the service request information to obtain first key information;

in a case where a number of first key information is greater than a preset number, invoke an information merging service in the intelligent agent platform, and determining second key information from a plurality of first key information; and invoke a service content determination service in the intelligent agent platform, and determine a first target service content based on the second key information;

wherein the at least one processor is configured to:

determine a reception timestamp of the service request information corresponding to each of a plurality of first key information;

sort the plurality of first key information according to the reception timestamps;

obtain an information merging result output from a large model by inputting first prompt information corresponding to the information merging service, and every two adjacent first key information of the plurality of first key information resulting from the sorting into the large model, wherein the information merging result is configured to indicate whether or not to merge the two adjacent first key information; and determine the second key information from the plurality of first key information based on the information merging result.

13. The apparatus according to claim 12, wherein the at least one processor is configured to:

in response to the information merging result indicating merging the two adjacent first key information, delete first key information sorted first among the two adjacent first key information, and take retained first key information among the two adjacent first key information as the second key information; and in response to the information merging result indicating not merging the two adjacent first key information, take the two adjacent first key information together as the second key information.

14. The apparatus according to claim 12, wherein the intelligent agent platform comprises a plurality of initial service contents, each initial service content has corresponding initial descriptive information;

wherein the at least one processor is configured to:

obtain a similarity between the second key information and each initial descriptive information output by a large model, by inputting the second key information, second prompt information corresponding to the service content determination service, and the initial descriptive information into the large model;

determine a similarity with a maximum value from a plurality of similarities; and determine the first target service content based on the similarity with the maximum value and the plurality of initial service contents.

15. The apparatus according to claim 14, wherein the at least one processor is configured to:

in response to the similarity with the maximum value being greater than or equal to a similarity threshold, take an initial service content described by initial descriptive information corresponding to the similarity with the maximum value as the first target service content; or in response to the similarity with the maximum value being less than the similarity threshold, obtain the first target service content matching with the second key information from other platform based on a second interface of the intelligent agent platform.

16. The apparatus according to claim 12, wherein the at least one processor is configured to:

in response to receiving candidate descriptive information from a third interface of the intelligent agent platform, invoke a function matching service in the intelligent agent platform, and process the service request information and the candidate descriptive information to determine a function matching result, wherein the function matching result is configured to describe a match situation between a first function supported by a candidate service content and a second function demanded by the service request information, and the candidate descriptive information is configured to describe the candidate service content; and determine a second target service content based on the function matching result.

17. The apparatus according to claim 16, wherein the at least one processor is configured to:

in response to the function matching result indicating that the first function matches the second function, take the candidate service content corresponding to the function matching result as the second target service content; and in response to the function matching result indicating that the first function does not match the second function, invoke the key information extraction service, and perform the key information extraction on the service request information to obtain the first key information, and invoke the service content determination service, and determine the second target service content based on the first key information.

18. A non-transitory computer-readable storage medium with computer instructions stored thereon, wherein the computer instructions are configured to cause the computer to perform:

in response to receiving service request information from a first interface of the intelligent agent platform, invoking a key information extraction service in the intelligent agent platform, and performing key information extraction on the service request information to obtain first key information;

in a case where a number of first key information is greater than a preset number, invoking an information merging service in the intelligent agent platform, and determining second key information from a plurality of first key information; and invoking a service content determination service in the intelligent agent platform, and determining a first target service content based on the second key information, wherein invoking the information merging service in the intelligent agent platform, and determining the second key information from the plurality of first key information comprises:

determining a reception timestamp of the service request information corresponding to each of a plurality of first key information;

sorting the plurality of first key information according to the reception timestamps;

obtaining an information merging result output from a large model by inputting first prompt information corresponding to the information merging service, and every two adjacent first key information of the plurality of first key information resulting from the sorting into the large model, wherein the information merging result is configured to indicate whether or not to merge the two adjacent first key information; and determining the second key information from the plurality of first key information based on the information merging result.

* * * * *